Gilbert E. Porter,
INVENTOR.

BY Knight & Rodgers
ATTORNEYS.

United States Patent Office 2,847,828
Patented Aug. 19, 1958

2,847,828

BRAKE BOOSTER

Gilbert E. Porter, Escondido, Calif., assignor of one-sixth to David Frees, one-sixth to Edwin L. Schwartz, and one-sixth to Barney M. Greenberg, all of Los Angeles, Calif.

Application December 5, 1955, Serial No. 550,976

7 Claims. (Cl. 60—54.5)

The present invention relates generally to hydraulic brake systems for automotive vehicles, and more especially to power units for use in such brake systems for the purpose of reducing the work done by the driver in applying the brakes. Power units of this type are connected to the intake manifold of the engine as a source of power and are therefore commonly referred to as "vacuum boosters" as they boost or increase the hydraulic pressure produced in the brake systems by a given effort on the part of the driver when manually applying the brakes.

It is highly desirable that power units for this type of service have certain operating characteristics in order to be satisfactory. It is obvious that a unit of this type should not be highly sensitive nor over control the brakes. In other words it should not produce a full or excessive application of the brakes when only a partial or light application is intended. Likewise it should not delay in response. These characteristics are interwoven with another which is that the device should not produce a harsh or sudden application of the brakes except in response to a full depression of the brake pedal. These features combine to produce a power unit which applies the brakes at the desired rate and in complete response to the action of the driver so that the operation of the unit is at all times completely under the driver's control.

Another aspect of a desirable power unit is that it allows the driver to retain the usual feel of the brake system which is his guide to application of the brakes in a system which does not have any power unit. This enables the driver to have full control over the application of the brakes and keeps the power unit completely responsive to his operation of the brake pedal. An important reason for having this characteristic in a power unit is that it does not require a change in present driving habits which have been learned over a period of time driving vehicles equipped with either hydraulic or mechanical brake systems as long as the feel and response to the pressure on the brake pedal is substantially comparable.

It is also desirable that a power unit be able to hold at any degree of application, neither increasing nor decreasing the amount of application. This requires that there be a substantial range of movement of the brake pedal from full release to full application of the brakes and at any intermediate point in this range of movement the power unit stops its operation of applying the brakes without requiring the driver to retract the brake pedal by reducing pressure upon it. Instead, it is desirable that if the pressure on the brake pedal is reduced sufficiently to stop forward movement of the pedal, that the power unit respond in the same manner and hold the degree of application of the brakes then reached.

It is desirable that when the brakes are fully released the entire hydraulic system be in free communication in order that any leakage at the brake cylinders or at any other point in the system can be compensated for by addition of fluid from the reservoir which is normally located at the master cylinder. This characteristic permits frequent replenishment of the hydraulic fluid and insures maintenance of equal pressures on all parts of the system.

Thus it becomes a general object of my invention to provide a power unit for hydraulic brake systems which possesses all of the above characteristics and yet which can be made and sold as an accessory unit which can be added to any type of existing brake system.

It is a further object of my invention to make a power unit of this character which is simple in construction, reliable in its operation, and easy to maintain in proper operating condition.

These and other objects of my invention have been achieved in a preferred embodiment of my invention by providing a pressure booster for use in a hydraulic brake system having a master cylinder that serves as a source of primary pressure on the hydraulic fluid, the pressure booster including an auxiliary cylinder which serves as a source of secondary pressure on the hydraulic fluid in the system for actuating the brake cylinder. The auxiliary cylinder includes a plunger within the cylinder which is advanced by the motor member to a position of increased secondary pressure, the motor member being movable forwardly in response to the differential and fluid pressures applied to opposite sides of the members. The plunger within the hydraulic cylinder and the motor member are normally biased rearwardly towards a rear position which they occupy when the brakes are released. The means for producing a differential in fluid pressure on the motor member includes a housing which covers one side of the motor member at least to form a compartment of variable volume which is connected to the intake manifold of the engine as a source of reduced pressure for reducing pressure in the chamber in causing movement of the motor member in a forward direction.

A fluid passage extends entirely through the pressure booster and is connected at one end to the master cylinder which is actuated by the brake pedal and is connected at the other end to the power units or brake cylinders. When the power unit is at rest and the brakes are released, the fluid passage through the unit is completely open in line with free communication and passage of hydraulic fluid through the system. The fluid passage includes a check valve which is located in the plunger. The check valve when closed prevents flow in the reverse direction from the brake units towards the master cylinder. Means are provided for holding this valve open when the plunger reaches the rest position, the valve being biased towards a closed position so that the valve closes automatically when the plunger is advanced a short distance. The fluid passage means also includes an expansible chamber which provides for independent movement of the plunger relative to the motor member in response to the primary hydraulic pressure. A second valve means is provided for controlling differential and fluid pressure applied to the motor member. This second valve means includes a movable valve member which opens and closes the opening of the vacuum line into the compartment at one side of the motor member in order to control the exhaust of air from that compartment. The same valve member is slidably mounted in the motor member in order to open and close air passages which, when open, permit air to flow through the motor member into the compartment. This second valve means is opened and closed in response to relative movement of the plunger and the motor member.

How the above objects and advantages of my invention, as well as others not specifically mentioned herein, are attained will be better understood by reference to the following description and to the annexed drawing in which.

Figure 1:
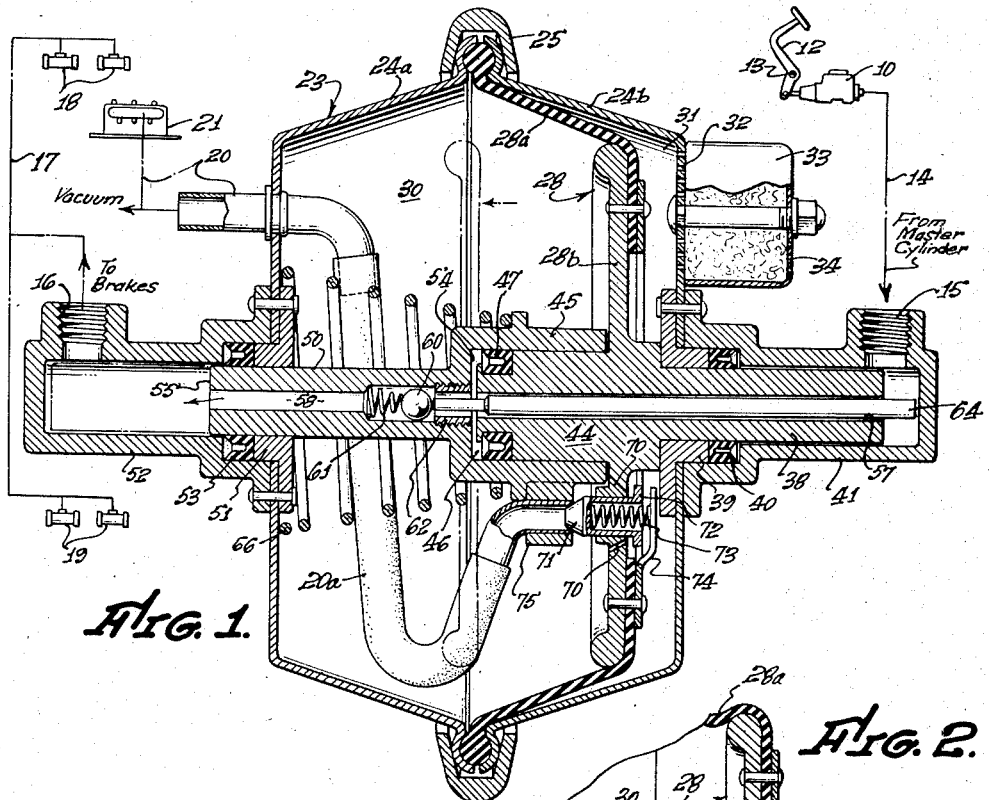
Fig. 1 is a longitudinal median section through a preferred embodiment of my invention in the rest position, the conventional portions of the brake system being indicated diagrammatically in order to illustrate the location of my improved form of pressure booster in the brake system.

Referring now to the drawings, there is shown in Fig. 1 in a longitudinal median section a preferred embodiment of my invention. In order to illustrate a complete system, other conventional elements are shown diagrammatically. A master cylinder of any conventional design is indicated at 10 and serves as a primary source of pressure on the hydraulic fluid in the system. This master cylinder is connected to a manually operated pedal 12 which is a conventional brake pedal pivoted at 13 to the vehicle. It is depressed manually by the driver of the vehicle in order to apply the brakes, the relation between the pedal and the master cylinder being such that as the pedal is depressed the primary pressure created by the master cylinder is increased. The outlet side of the master cylinder is connected by hydraulic line 14 with the inlet 15 of the pressure booster. Likewise the outlet 16 for the hydraulic fluid from the pressure booster is connected to lines 17 which lead to brake cylinders 18 and 19 on the front and rear wheels respectively. Brake cylinders 18 and 19 may be of any conventional design and are the units which are operated by the hydraulic fluid under pressure to expand the brake shoes and set the brakes on the vehicle. For reasons that will be explained later in greater detail, the vacuum booster is also connected by line 20 to the intake manifold of engine 21 which provides power for driving the vehicle.

From Fig. 1 it will be seen that the pressure booster includes a housing 23 consisting of two similar dish-shaped halves 24a and 24b which are clamped together around their rims by clamping ring 25. The housing encloses a movable motor member 28 which in this embodiment of the invention takes the form essentially of a diaphragm dividing the interior of housing 23 into two compartments. The motor member 28 consists of a flexible annular section 28a which is confined around its entire periphery by being clamped between the two housing sections 24a and 24b, and a rigid central section 28b. This central section is a disc shaped plate that preferably has a diameter as large as can be placed within the housing and still provide adequate clearance around it, since the area of the plate is a factor in determining the amount of power developed by the pressure booster. The flexible outer portion 28a of the diaphragm permits reciprocating movement of plate 28b within the housing while still maintaining an air tight seal between the diaphragm and the housing. It will be understood that a piston and cylinder or other suitable arrangement may be used instead of the housing and diaphragm, if desired.

One half 24a of the housing cooperates with the motor member 28 to define, at one side of the motor member, chamber 30 which is of variable volume since the motor member defines one wall of the chamber which is movable and by its movement varies the size of the chamber. The other half 24b of the housing likewise cooperates with the motor member to provide a second chamber 31 of variable volume, although it is not necessary to operation of the device that the motor member be entirely enclosed on this other side. Housing 24 is provided with a number of openings 32 over which is placed filter 33 that is filled with a body of fibrous material, such as steel wool, or glass wool, adapted to strain out particles of dust or the like carried by air passing through the body of filter material. The outer wall of air filter 33 is provided with a plurality of small openings 34 so that air may enter and pass through the filter and then through openings 32 to enter compartment 31. This air filter is an entirely optional feature but it will be obvious that it is preferable to admit only clean air to compartment 31 since dirt particles may interfere with proper functioning of the valves, later described, and abrade the relatively moving surfaces.

The side of the motor member 28 exposed in compartment 31 is always exposed to air at atmospheric pressure. The other side of the motor member exposed in compartment 30 can be subjected to air at a reduced pressure. In order to create a reduction in air pressure within chamber 30, this chamber is connected to the intake manifold of engine 21 by conduit 20 which passes through one wall of housing section 24a. Inside the housing, vacuum line 20 includes a flexible section 20a and terminates at opening 20b where conduit 20 opens to the interior of compartment 30. As is well known, there exists within the intake manifold of an internal combustion engine a pressure which is substantially below atmospheric and which serves as a very convenient source of reduced pressure. By means of conduit 20, the air in compartment 30 can be partially evacuated so that there is thus created a differential in the fluid pressures on the two sides of plate 28; as a consequence of creating the differential pressure, the motor member is moved to the left in Fig. 1 since the higher pressure exists on the right hand side.

For convenience of reference during description, movement towards the left in Fig. 1 or positioning of one part with respect to another one in that direction is hereinafter referred to as in the forward direction or at the forward side because that is the direction of movement of the motor member and associated parts during application of the brakes and when the motor member is operating to boost pressure in the hydraulic system. Accordingly, movement of any of the parts toward the right in Fig. 1 or positioning of one part relative to another one toward the latter side of Fig. 1 is hereafter referred to as in a rearward direction or at the rearward side.

On its rearward side, the motor member is provided with cylindrical extension 38 slidably mounted in guide bearing 39 in order to support and guide the motor member during its normal movement. A liquid seal of any suitable type is indicated at 40 as surrounding extension 38. The sealing means 40 is contained within a cylindrical housing 41 mounted upon the rear wall of the main housing. Housing 41 is provided with inlet 15 for hydraulic fluid, the inlet being connected to conduit 14 in order to receive hydraulic fluid under primary pressure from master cylinder 10.

At its forward side, the motor member is provided with another cylindrical projection 44 upon which is slidably mounted a surrounding cuplike member 45. As will be more fully discussed, the members 44 and 45 provide a piston and cylinder arrangement and define between them an expansible chamber 46 which is enlarged by movement of cylinder 45 in a forward direction with relation to the piston 44. It is preferable to provide piston 44 with a suitable fluid sealing means 47.

Projecting forwardly from cylinder 45, and preferably formed integrally therewith, is plunger 50 which slides within guide bearing 51 mounted on the forward wall of housing 23. The forward portion of plunger 50 moves within auxiliary cylinder 52 which is mounted on the forward wall of housing 23 and is provided with outlet 16 for hydraulic fluid, this outlet being connected to the distribution line 17 leading to the brake cylinders. Forward movement of plunger 50 within cylinder 52 applies pressure upon the hydraulic fluid within the cylinder. In order to hold the pressure within the auxiliary cylinder, suitable packing 53 is provided surrounding plunger 50 to prevent leakage of fluid.

It is to be noted that the internal diameter of cylinder 45 is greater than the internal diameter of auxiliary cylinder 52. Consequently, the net area of the rearwardly facing surface 54, which is one wall of expansible chamber 46 and may be regarded as being on plunger 50, is larger than the area of the forwardly facing surface 55 at the forward end of the plunger within the auxiliary cylinder. The reasons for this will be discussed later.

Fluid passage means are provided which extend through the booster unit from inlet 15 to outlet 16. This includes passage 57 which extends longitudinally through piston 44 and extension 38, thus passing through the motor member completely and providing means for introducing hydraulic fluid from inlet 15 to chamber 46. A second similar passage 58 extends longitudinally through plunger 50 from rear face 54 to the forward end of the plunger, thus providing means for fluid flow from chamber 46 through the plunger and into the interior of auxiliary cylinder 52, from whence the liquid may be discharge through outlet 16.

Flow of hydraulic fluid through this passage means is controlled by means of ball check valve 60 which is biased towards a closed position by compression spring 61 which bears at one end against a shoulder on the plunger and at the other end against the ball, urging it against seat 62 which is threaded into, or otherwise secured to, the plunger.

Means are provided for holding the valve open when the parts are in the rest position of Fig. 1. This means includes rod 64 located in fluid passage 57 and free to slide therein with respect to the motor member. Clearance exists between the walls of passage 57 and rod 64 to permit fluid flow through the passage. Rod 64 is long enough that when the motor member is moved fully to the right, the rear end of the rod engages the end wall of housing 41, while the other end of the rod engages ball 60 and lifts it off seat 62, as shown in Fig. 1. Under these conditions, fluid passage means 57—58 is open and fluid may flow in either direction through the passage means between inlet 15 and outlet 16 of the booster.

Both plunger 50 and the motor member are biased toward a rearward position so that when the parts are at rest and the brakes are released, the parts occupy the positions shown in Fig. 1. This biasing action is accomplished by compression spring 66, one end of which bears against the inner surface of housing section 24a and the other end against a shoulder on cylinder 45. Since cylinder 45 and plunger 50 are connected together, spring 66 continually urges plunger 50 towards the position in which it is fully retracted from cylinder 52 and is held rearwardly against the motor member. The force of spring 66 compresses chamber 46, moving the cylinder rearwardly until it engages the plate portion 28b of the motor member. When the cylinder, which may be considered as an extension of plunger 50, is in engagement with the motor member, the thrust of spring 66 is communicated to the motor member and thus the latter is also biased toward a rearwardly position; moves in this direction until the shoulder of the motor member comes into engagement with guide 39.

In order to control the flow of air through the motor member from compartment 31 to compartment 30, there is provided one or more air passages 70 which extend through plate 28, and a valve member 71, slidably mounted in plate 28, which is adapted to regulate air flow through passages 70. Valve 71 is provided with flange 72 of enlarged diameter which is adapted to overlie and close the inlet end of passages 70. Valve 71 is normally urged towards a closed position by spring 73 which bears against the valve and arm 74 which is attached to the motor member. Spring 73 normally holds valve 71 in the forward position closing passages 70, as shown particularly in Fig. 2. Valve 71 is moved rearwardly to the open position of Fig. 1 by a force applied to the inner or forward end of the valve by engagement with the projection 75 on cylinder 45, as shown in Fig. 1.

Although a different and separate valve means may be used if desired, valve 71 is also used as a valve means for controlling the exhaust of air from chamber 30. This is accomplished by providing the terminal opening 20b of vacuum line 20 with a valve seat on projection 75. The forward end of valve 71 is tapered to engage the seat and thereby close opening 20b to the flow of air into line 20 from compartment 30. In this way valve 71 serves to control the differential fluid pressure applied to the motor member. Valve seat at 20b is moved toward and away from valve 71 by movement of plunger 50 relative to the motor member which carries valve member 71; and it is this relative movement of the plunger and motor member which opens and closes not only vacuum line 20 but also air passages 70.

Having described a preferred embodiment of my invention, I will now set forth briefly its method of operation. When the brakes are fully released, the parts of the pressure booster occupy the position of rest shown in Fig. 1. Plunger 50 and the motor member 28 have been moved rearwardly under the thrusts of spring 66 and chamber 46 is reduced to the minimum volume. Air ports 70 are open so that air pressure in chambers 30 and 31 is equalized and there is no differential pressure existing on the motor member. Valve 71 engages port 20b, closing it so that no air is exhausted from compartment 30 by vacuum line 20. It may be assumed that the pressure on the hydraulic fluid in the system is at zero. Actually it is conventional practice to maintain a small residual pressure on this hydraulic fluid; but since the value of this residual pressure is the datum above which all other pressures are measured, it may be considered as the zero value for purposes of this description.

As the operator applies the brakes, he depresses pedal 12 and master cylinder 10 applies pressure to the hydraulic fluid in the system. This primary pressure on the hydraulic fluid is transmitted through line 14 to the pressure booster unit and through passages 57 and 58 it is transmitted to conduit 17 and the brake cylinders 18 and 19 in the conventional manner. As this primary hydraulic pressure is increased, plunger 50 tends to move ahead of the motor member which initially remains in the rest position. Relative movement of plunger 50 occurs because of the difference in areas between surfaces 54 and 55. As long as valve 60 remains open the fluid pressure in auxiliary cylinder 52 is the same as the fluid pressure within chamber 46; and consequently the forward thrust on surface 54 of the plunger is greater than the rearward thrust against surface 55 because of the larger area of surface 54. Consequently, the plunger advances independently of the motor member, comprising spring 66, until a point is reached in the movement at which valve 60 is no longer held open by rod 64. Ball 62 now is urged by spring 61 against seat 62, closing the valve to prevent flow of hydraulic fluid in a rearward direction from the auxiliary cylinder to the master cylinder 10.

When this check valve closes, there results a compounding action since the total forward force on plunger 50 is able to produce a higher unit pressure on the hydraulic fluid within auxiliary cylinder 52. As a consequence, the secondary fluid pressure which is generated by the auxiliary cylinder exceeds the primary fluid pressure, the two zones of pressure being separated by check valve 60. It will be appreciated that it is now the secondary pressure which is transmitted to cylinders 18 and 19 operating the brakes so that the brakes are actuated in response to the value of the secondary pressure. The degree of compounding action is determined by the ratio of areas 54 and 55 and takes place without any power being delivered to the system by the motor member.

An increase in the primary fluid pressure by movement of brake pedal 12 results in an expansion of chamber 46, further advancing the plunger with respect to the motor member. As movement of the plunger continues, a point is reached at which the valve seat at opening 20b is moved away from valve member 71 and the terminus of line 20 is open so that air is exhausted from chamber 30 through line 20 to the intake manifold of engine 21. The reduction of air pressure within chamber 30 relative to the atmospheric pressure exerted on the opposite side of plate 28b creates a differential fluid pressure on plate 28b which moves the motor member forwardly. The thrust of the motor member is transmitted through the hydraulic fluid within chamber 46 to the rear end of the plunger which in turn is advanced within the auxiliary cylinder. This advance of the plunger increases the secondary pressure on the hydraulic fluid and applies the vehicle brakes.

Figure 2:
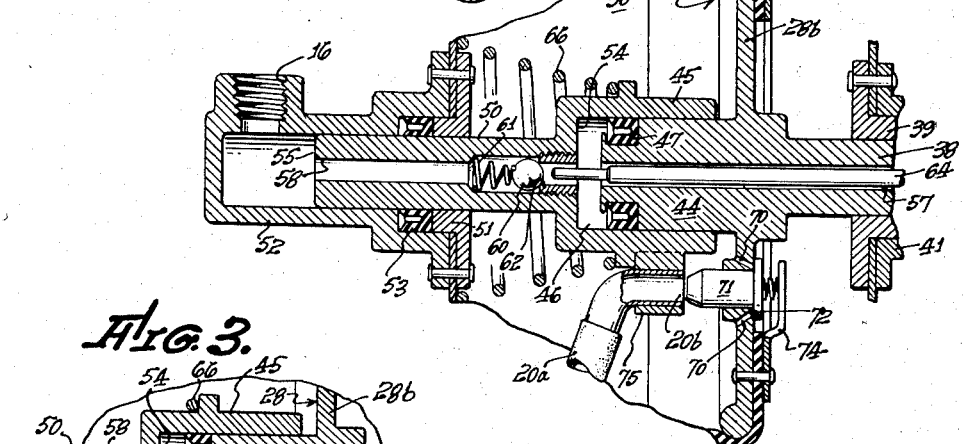
Fig. 2 is a fragmentary section similar to Fig. 1 showing the positions occupied by the parts as the brakes are being applied.
Figure 3:
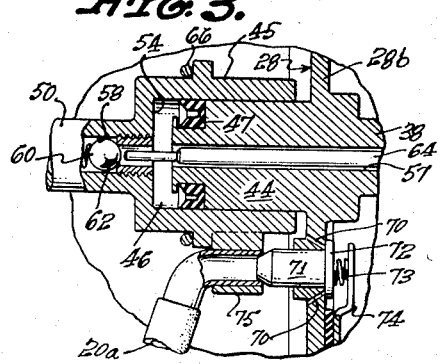
Fig. 3 is a fragmentary section similar to Fig. 2 showing positions occupied by certain of the parts when the brakes are being held in applied position.

Relative positions of the parts enabling the advancing movement of the plunger is shown in Fig. 2, the air exhaust port 20b being open and chamber 46 being expanded. As long as the force exerted on pedal 12 by the operator is sufficient to continue depressing the pedal and thus increase the primary pressure, this advancing movement of the plunger continues. This is true because the increasing primary pressure is able to expand chamber 46 and thus transmit the increased force from the motor member to the rear end of plunger 50. However, when the vehicle operator stops the downward movement of the pedal 12 so that the primary fluid pressure reaches a steady value, the power applied to motor member 28 by differential air pressure causes it to continue to advance with respect to the plunger for a short distance until valve member 71 is brought into engagement with the valve seat at opening 20b. Closing opening 20b shuts off the exhaust of air from the chamber at the forward side of the motor member. When this occurs, the parts remain in same position as shown in Fig. 3 which is the holding position of the pressure booster. In this position the degree of application of the brakes that has been reached by depression of brake operating pedal 12 is maintained as long as the brake pedal is held in that position.

Actually, the brake pedal may be maintained in that position with a force less than that required to reach the position since no reverse movement of the parts of the pressure booster takes place until the primary pressure has been decreased to some lower value at which plunger 50 is able to move toward the motor member under the combined thrust of the secondary fluid pressure and spring 66. When this point is reached, hydraulic fluid is exhausted from chamber 46 through fluid passage 57 and the chamber is reduced in size, permitting the plunger to move toward the motor member. Since valve member 71 is already in engagement with the valve seat at 20b, the relative rearward movement of cylinder 45 now slides valve 71 rearwardly in plate 28b, opening air passages 70 as in Fig. 1. Air is now able to flow around valve 71 from the high pressure chamber 31 to the low pressure chamber 30 as long as valve 71 remains open. This flow of air through the passages 70 eliminates the differential air pressure on the motor member and motor member moves rearwardly under the thrust applied to it by spring 66. Although spring 66 bears on cylinder 45, it moves the end of the cylinder against plate 28a and then the cylinder and plate move rearwardly as a unit under the influence of the spring. This movement continues until the parts have been returned to the rest position shown in Fig. 1.

I claim:

1. A pressure booster for use in a hydraulic brake system having a master cylinder as a source of primary pressure on hydraulic fluid to operate brake cylinders, comprising: a motor member movable forwardly in response to a differential in fluid pressures applied to the member and biased rearwardly toward a rest position; means for producing a differential in fluid pressure applied to the motor member; an auxiliary cylinder serving as a source of secondary pressure on the hydraulic fluid in the system to actuate the brake cylinders, including a single plunger within the cylinder advanced to a position of increased secondary pressure by the motor member and biased to a rearward rest position, said plunger having substantially the same net effective area as the cross-sectional area of the auxiliary cylinder and being slidably connected to the motor member only at a position outside the auxiliary cylinder for independent movement relative thereto in response to primary hydraulic pressure; first valve means controlling flow of hydraulic fluid between the master and auxiliary cylinders and, when closed, preventing flow from the auxiliary cylinder to the master cylinder; and a second valve means controlling the differential in fluid pressure applied to the motor member, said second valve means being opened and closed in response to relative movement of the plunger and motor member.

2. A pressure booster as in claim 1 in which the plunger and the motor member have opposing relatively movable surfaces of substantially equal effective area exposed to hydraulic fluid under primary pressure, the surface on the plunger facing rearwardly and being of a larger area than the forward end of the plunger in the auxiliary cylinder whereby the plunger is advanced by an increase in said primary pressure to a position allowing the check valve to close.

3. A pressure booster for use in a hydraulic brake system having a master cylinder as a source of primary pressure on hydraulic fluid to operate brake cylinders, comprising: a motor member movable forwardly in response to a differential in fluid pressure applied to the member and biased rearwardly to a rest position; a housing cooperating with the motor member to form at the forward side of the motor member a variable volume compartment; condiut means communicating with the compartment and with a source of reduced fluid pressure to create a lowered pressure in said compartment; an auxiliary cylinder serving as a source of secondary pressure on the hydraulic fluid in the system to actuate the brake cylinders, including a plunger operatively connected to the motor member to be advanced thereby to increase said secondary pressure and biased toward a rearward rest position, the plunger and motor member being capable of relative movement; means carried by the plunger forming a valve seat defining the terminus of said conduit opening into the compartment; and a valve member carried by the motor member and adapted to engage the valve seat to close the conduit, said valve member being disengageable from the valve seat by relative movement of the plunger and motor member away from each other.

4. A pressure booster as in claim 3 in which the valve member is movably mounted on the motor member which has air passage means extending through it and opening into the compartment forwardly of the motor member, said valve member being biased to a position closing said air passage means and movable to a position opening said air passage means by engagement with the valve seat.

5. A pressure booster as in claim 3 which also includes a second valve means carried by the plunger controlling flow of hydraulic fluid between the master and auxiliary cylinders, said second valve means defining the boundary between primary and secondary pressure on the hydraulic fluid.

6. A pressure booster for use in a hydraulic brake system having a master cylinder as a source of primary pressure on hydraulic fluid to operate brake cylinders, comprising: a motor member movable forwardly in response to a differential in fluid pressures applied to the member; means for applying a differential fluid pressure to the motor member; a first cylinder means connected to the master cylinder to receive hydraulic fluid under primary pressure to move the motor member in response to said primary pressure; an auxiliary cylinder having an outlet at one end discharging to the brake cylinders and serving as a source of secondary pressure on the hydraulic fluid in the system to actuate the brake cylinders, including a plunger movable within the auxiliary cylinder to produce secondary pressure in excess of the primary pressure; means operatively connecting the plunger and motor member for limited relative movement and defining an expansible chamber; fluid passage means for hydraulic fluid extending from a connection with the first cylinder means through the motor member to the expansible chamber and then through the plunger to the auxiliary cylinder; valve means carried by the plunger controlling hydraulic flow through said passage means and, when closed, preventing fluid flow from the auxiliary cylinder to the master cylinder; resilient means urging the plunger and motor member rearwardly to a rest position and yielding to permit forward movement of the plunger and motor member; and means holding said valve means open when the plunger is in said rearward rest position to establish free hydraulic flow through the passage means.

7. A pressure booster for use in a hydraulic brake system having a master cylinder as a source of primary pressure on hydraulic fluid to operate brake cylinders, comprising: a motor member movable forwardly in response to a differential in fluid pressures applied to the member and biased rearwardly toward a rest position; means for producing a differential in fluid pressure applied to the motor member; a first cylinder means connected to the master cylinder to receive hydraulic fluid under primary pressure to move the motor member in response to said primary pressure; an auxiliary cylinder serving as a source of secondary pressure on the hydraulic fluid in the system to actuate the brake cylinders, including a plunger within the cylinder advanced to a position of increased secondary pressure by the motor member and biased to a rearward rest position; and piston-and-cylinder means attached to said plunger and said motor means and defining a chamber communicating with the first cylinder means to receive hydraulic fluid under primary pressure, said piston-and-cylinder means providing for relative movement of the plunger and motor member and transmitting thrust of the motor member through fluid in said chamber to the plunger to advance the plunger in the auxiliary cylinder.

References Cited in the file of this patent

UNITED STATES PATENTS

| | | |
|---|---|---|
| 2,260,491 | Stelzer | Oct. 28, 1941 |
| 2,377,699 | Klimkiewicz | June 5, 1945 |
| 2,407,856 | Stelzer | Sept. 17, 1946 |
| 2,415,035 | Penrose | Jan. 28, 1947 |
| 2,438,723 | Stelzer | Mar. 30, 1948 |
| 2,448,981 | Ingres | Sept. 7, 1948 |
| 2,450,160 | Price | Sept. 28, 1948 |
| 2,672,015 | Adams | Mar. 16, 1954 |
| 2,680,349 | Hill et al. | June 8, 1954 |